May 1, 1928.
A. BERNHARD
1,668,350
WINDSHIELD SCREEN FOR AUTOMOBILES
Filed Feb. 21, 1927
Fig. 1.
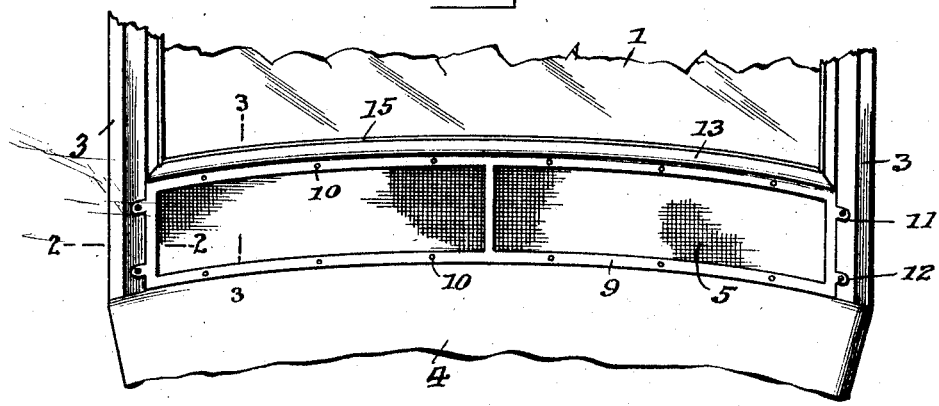
Fig. 2.
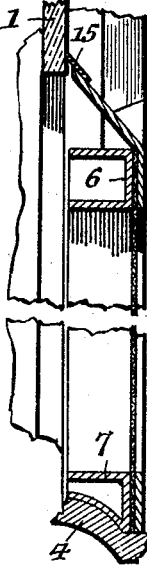
Fig. 3.
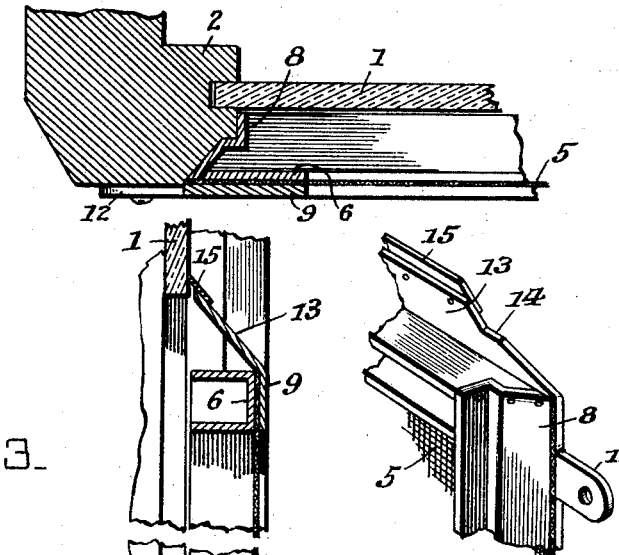
Fig. 4.
Inventor
August Bernhard
By Jacobi & Jacobi
Attorneys Patented May 1, 1928.

1,668,350

UNITED STATES PATENT OFFICE.

AUGUST BERNHARD, OF TAMMS, ILLINOIS.

WINDSHIELD SCREEN FOR AUTOMOBILES.

Application filed February 21, 1927. Serial No. 169,949.

This invention relates to new and useful improvements in screens and more particularly to a screen for use in connection with a particular type of adjustable wind shield for automobiles, the primary object of the invention being to provide a screen which may be readily applied to use to cover the space left open by the raising of the wind shield, thereby protecting the occupants of the automobile from flying gnats, flies or other insects and to prevent an undue amount of dust and dirt from entering the automobile as the same is propelled.

It is a well known fact that in certain sections of the country, the numerous gnats and flies in the air particularly in the summer season, make driving with an open wind shield quite dangerous and exceptionally uncomfortable. In the spring and summer seasons, it is desirable to have the wind shield open for the admission of air, and with the prevailing type of wind shield, that is, the vertically movable type, well known as the "V V type", flying insects may readily enter through the opening caused by the raising of the wind shield, making it uncomfortable and annoying to the occupants as well as dangerous to the driver. My invention contemplates the use of a screen applicable to the type of wind shield mentioned hereabove which will overcome the difficulties referred to.

A further object of the invention resides in providing a screen, the frame of which is preferably made of light, non-rustable metal, the upper and lower bars of which are preferably tubular or hollow to provide a light construction and at the same time economize on the manufacture.

Still another object resides in providing a strip for retaining the screening material to the frame which is provided with an inclined flange having a rubber tip portion contacting with the wind shield, thus preventing the admission of water, dirt or dust to the interior of the car.

A still further object of the invention resides in providing a device which is simple and durable in construction, inexpensive to manufacture, and one which will be very efficient and useful in operation.

With these and other objects in view, my invention consists in the novel features of construction, combination and arrangement of parts as will be hereinafter referred to and more particularly pointed out in the specification and claims.

In the accompanying drawing forming a part of this application,

Figure 1 is a fragmentary front elevation of an automobile showing my improved wind shield screen applied to use;

Figure 2 is an enlarged fragmentary section as seen on the line 2—2 of Figure 1;

Figure 3 is an enlarged fragmentary vertical section as seen on the line 3—3 of Figure 1; and Figure 4 is a fragmentary detail perspective view of the wind shield screen removed.

In describing the invention, I shall refer to the drawing in which similar reference characters designate corresponding parts throughout the several views and in which 1 designates a vertically movable wind shield of the well known "V V type" mounted in the side bars 2 of a frame supported between the side posts 3. The lower edge of the wind shield 1 is, as usual, curved to conform to the curvature of the upper edge of the cowl 4 of the body of the automobile. When the wind shield is raised, an air space is provided between the cowl and the lower edge of the wind shield and my improved device is provided to cover this space.

To this end, I provide a screen composed of a strip of wire mesh designated by the numeral 5 and having its upper and lower edges curved to conform to the curvature of the cowl and the lower edge of the wind shield, said strip being secured in a frame of an improved character, as will be hereinafter and more particularly set forth.

This frame comprises upper and lower members 6 and 7, respectively, and side bars 8. The upper and lower members are preferably hollow, being tubular or any preferred general design, the lower member 7 being shaped to conform to the curvature of the cowl upon which it rests when the screen is applied to use. The side bars 8 are strips, formed preferably of light metal similar to the material of which the members 6 and 7 are formed, and are stamped to conform to the irregular formation of the bead or side bars 2 of the frame supporting the wind shield, as clearly shown in Figures 2 and 4 of the drawing. These side bars 8 abut the ends of the upper and lower members 6 and 7 and the ends of the latter members are obviously cut to conform to this irregular formation of the end bars, as clearly shown in Figure 4 of the drawing.

The members 6, 7 and 8 form a frame to which the strip of mesh 5 is applied and secured, said mesh being held in place by means of an outer marginal frame 9, which may be formed or stamped from a single strip of material or formed of strips, as may be desired. The outer marginal frame 9 is secured to the base frame, composed of the members 6, 7 and 8, by means of the screws 10, thereby holding the wire mesh 5 in place, and formed integral with the vertical end pieces of the frame 9 and projecting outwardly therefrom are the ears 11. These ears are adapted to abut the outer faces of the side posts 3 and having openings therein whereby the screws 12 may be admitted therethrough to secure the device to the automobile body. When secured in place, the screen fits snugly between the cowl and the frame of the wind shield and ornaments the automobile. It may be applied for permanent use or for use during certain periods of the year and when removed, the openings receiving the screws 12 may be plugged, if desired, with ornamentally-headed screws.

When applied to use, it is obvious that the wind shield may be raised to permit air to pass through the screen but the latter will prevent the admission of flying insects or extraneous matter. In order that the device may have a close contact with the wind shield at all times, the upper strip of the outer frame 9 is provided with an integral upwardly and inwardly inclined flange 13, the end edges of which are offset as shown at 14 to conform to the irregular contour of the beads or side bars 2 of the frame supporting the wind shield. Secured to the outer free edge of the flange 13 is a rubber or felt strip 15 which contacts at all times with the outer face of the wind shield 1, as clearly shown in Figure 3 of the drawing. Thus, water, dust, dirt or other extraneous matter will be prevented from entering over the top of the screen, the wind shield being limited in its vertical movement and the screen being constructed to always permit the strip 15 to contact with the wind shield, as shown in the drawing.

From the foregoing description of the construction of my improved device, the operation thereof will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to, without departing from the spirit or sacrificing any of the principles of the invention.

Having thus described my invention, what I claim is:

1. In combination with the wind shield of an automobile, a frame therefor and a cowl; of a screening device comprising a frame constructed to conform to and fit snugly between said cowl and the wind shield frame forward of said wind shield, a mesh screening member secured to the last mentioned frame, an outer marginal securing frame applied to the screening frame securing the mesh to the latter, means on the marginal frame for securing the screening device in position and an upwardly and inwardly inclined flange carried on the upper portion of said marginal frame for permanent contact with the wind shield.

2. In combination with the wind shield of an automobile, a frame therefor and a cowl; of a screening device comprising a frame constructed to conform to and fit snugly between said cowl and the wind shield frame forward of said wind shield, a mesh screening member secured to the last mentioned frame, an outer marginal securing frame applied to the screening frame securing the mesh to the latter, means on the marginal frame for securing the screening device in position, an upwardly and inwardly inclined flange formed on the upper portion of said marginal frame and a rubber strip applied to the free end of said flange normally contacting with the outer face of said wind shield.

In testimony whereof I affix my signature.

AUGUST BERNHARD.